(12) United States Patent
Li

(10) Patent No.: US 9,783,254 B2
(45) Date of Patent: Oct. 10, 2017

(54) BICYCLE SEAT ADJUSTMENT DEVICE

(71) Applicant: GREAT GO CYCLES INC., Taichung (TW)

(72) Inventor: Mu-Rong Li, Taichung (TW)

(73) Assignee: Great Go Cycles Inc., Taichung (TW)

( * ) Notice: Subject to any disclaimer, the term of this patent is extended or adjusted under 35 U.S.C. 154(b) by 145 days.

(21) Appl. No.: 15/011,667

(22) Filed: Feb. 1, 2016

(65) Prior Publication Data

US 2017/0217521 A1    Aug. 3, 2017

(51) Int. Cl.
*B62J 1/08*    (2006.01)

(52) U.S. Cl.
CPC ....................... *B62J 1/08* (2013.01)

(58) Field of Classification Search
USPC ............... 297/215.15, 215.14, 215.13
See application file for complete search history.

(56) References Cited

U.S. PATENT DOCUMENTS

| | | | | |
|---|---|---|---|---|
| 385,620 A * | 7/1888 | Hart | | B62K 21/00 280/270 |
| 5,007,675 A * | 4/1991 | Musto | | B62J 1/08 297/215.14 |
| 5,709,430 A * | 1/1998 | Peters | | B62J 1/002 297/201 |
| 6,488,334 B1 * | 12/2002 | Geyer | | B62J 1/00 248/299.1 |
| 7,431,391 B2 * | 10/2008 | Hsiao | | B62J 1/08 297/215.14 |
| 7,494,181 B2 * | 2/2009 | Tucker | | B62J 1/005 248/298.1 |
| 7,559,604 B2 * | 7/2009 | Beaulieu | | B62J 1/08 297/215.14 |
| 7,562,933 B1 * | 7/2009 | Chao | | B62J 1/08 297/195.1 |
| 8,002,347 B2 * | 8/2011 | Geyer | | B62J 1/00 297/195.1 |
| 8,226,058 B2 * | 7/2012 | Chen | | B62J 1/08 248/219.4 |
| 8,894,141 B2 * | 11/2014 | Tisue | | B62J 1/08 297/205 |
| 2007/0262623 A1 * | 11/2007 | Fortt | | B62J 1/04 297/215.13 |
| 2009/0001782 A1 * | 1/2009 | Lin | | B62J 1/08 297/215.15 |

FOREIGN PATENT DOCUMENTS

CA    DE-4312457 A1 * 10/1994    ............. B62J 1/06

* cited by examiner

*Primary Examiner* — David E Allred
(74) *Attorney, Agent, or Firm* — Rosenberg, Klein & Lee

(57) ABSTRACT

A bicycle seat adjustment device includes a seat post having a support member which has a first slot. A groove is defined in each of two sides of the support member. A support seat has a curved top and two plates extend from the underside of the support seat. The support member is clamped between the two plates. Each plate has a protrusion which is slidably engaged with the groove corresponding thereto. Two bolts extend through the two plates and the first slot. A clamp unit is connected to the top of the support seat so as to clamp a seat. Two fixing bolts extend through the support seat and are connected to the clamp unit. The seat is horizontally adjusted by moving the support seat along the first slot, and angularly adjusted by moving the support seat along the curved plates and the curved top of the support seat.

8 Claims, 6 Drawing Sheets

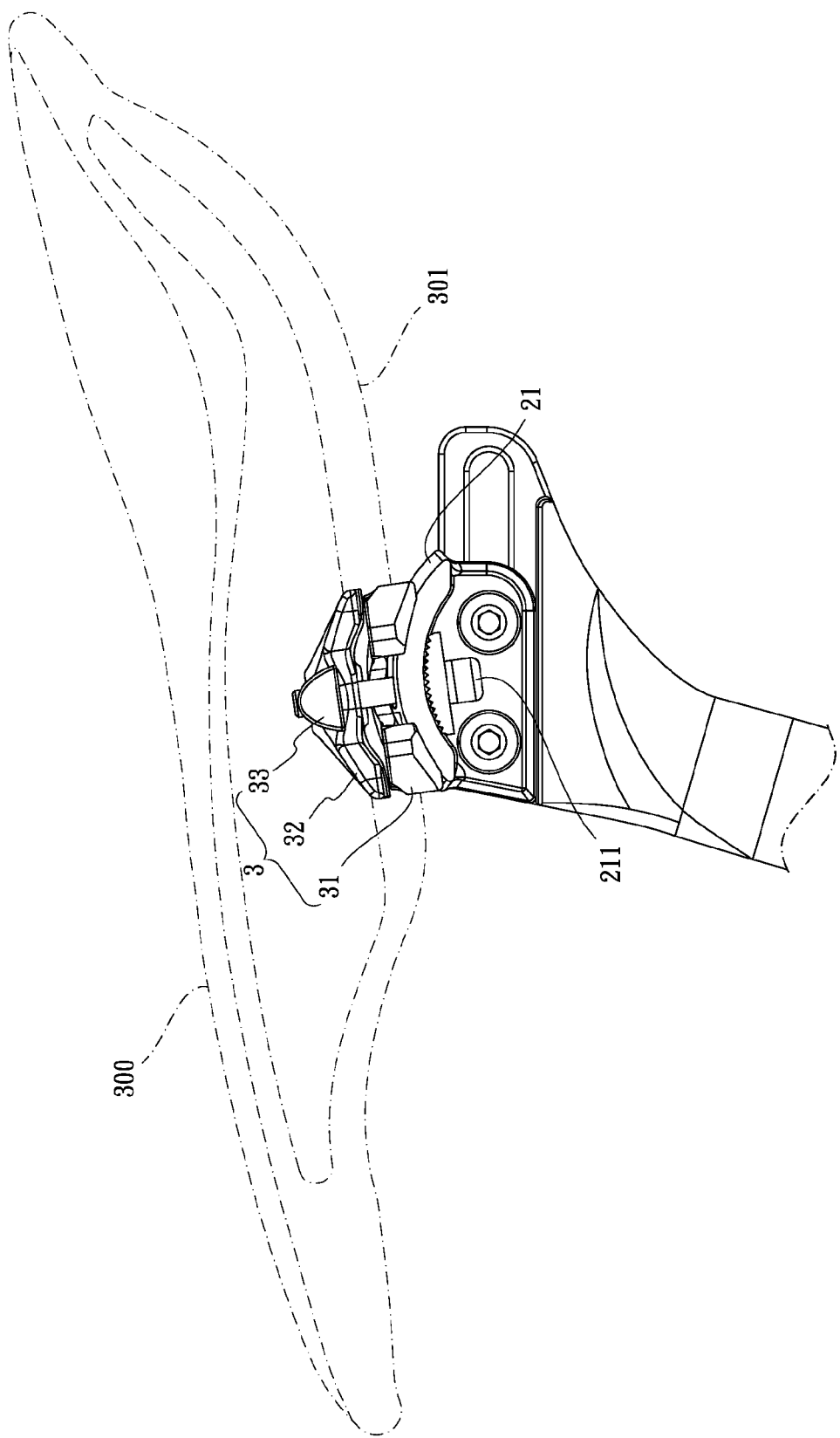

BICYCLE SEAT ADJUSTMENT DEVICE

BACKGROUND OF THE INVENTION

1. Fields of the invention

The present invention relates to a bicycle seat adjustment device, and more particularly, to a bicycle seat adjustment device for adjusting the distance between the seat and the handlebar, and the angle of the seat relative to the seat post.

2. Descriptions of Related Art

One of the conventional bicycle seat adjustment device known to applicant comprises a seat with a base portion extending from the underside thereof, and a first connection portion extends from the base portion and has teeth defined in the outside thereof A slot is defined through the first connection portion. The seat post has a second connection portion which has teeth defined in the outside thereof An inclined hole is defined in each of two ends of the second connection portion. The base portion has two engaging members received therein. Two bolts extend through the two inclined holes of the seat post and the slot of the first connection portion and are threadedly connected to the two engaging members. However, the seat has to be made with the first connection at the underside thereof so that the manufacturing processes are complicated and the cost is increased.

Another conventional bicycle seat adjustment device known to applicant comprises two clamp members which clamp the rails of the seat. Bolts are used to connect the two clamp members to securely clamp the rails of the seat. By unscrewing the bolts, the seat can be adjusted. Nevertheless, the adjustment can only be made within the range of the length of the rails, so that the adjustment range cannot meet needs of different cyclists of different heights.

Yet another conventional bicycle seat adjustment device known to applicant comprises a seat post with a radial opening, and a slot is defined in the inside of the radial opening so that the bolt extends from the radial hole and passes through the slot so as to be connected to the locking device which is securely connected to the seat. The advantage is that the cyclist can operate the bolt from the wide open space and which is convenient for the cyclists. The drawback is that there is no proper restriction device located between the seat and the locking device, so that the seat may not be well secured and positioned during assembling processes.

The present invention intends to provide a bicycle seat adjustment device which improves the shortcomings mentioned above.

SUMMARY OF THE INVENTION

The present invention relates to a bicycle seat adjustment device and comprises a seat post having a support member connected to the top thereof, and the support member has a first slot defined transversely therethrough. A groove is defined in each of two sides of the support member and communicates with the first slot. Each groove has an entrance at one end thereof and the entrance faces the forward direction of the bicycle. A support seat has a curved top and two curved boards respectively extend from two sides of the curved top of the support seat. Two plates extend from the underside of the support seat. Each plate has a protrusion extending from the inside thereof The support member is located between the two plates and the two protrusions are slidably engaged with the two grooves via the two entrances. At least one locking unit extends through the two plates, the two protrusions and the first slot so as to clamp the support member between the two plates.

A clamp unit is connected to the top of the support seat and clamps a seat. Two fixing bolts extend through the support seat and are connected to the clamp unit. The clamp unit is movable along the curved plates and the curved top of the support seat when the two fixing bolts are loosened.

Preferably, each of the two plates has two fixing holes which extend through the protrusion corresponding thereto. The at least one locking unit extends through each of the fixing holes and the first slot.

Preferably, the at least one locking unit includes two locking members and two tubular sleeves. The two locking members extend through the fixing holes of one plate and the first slot, and the two tubular sleeves extend through the fixing holes of the other plate and the first slot. The two locking members are threadedly connected to the two tubular sleeves. The support seat is movable along the first slot when the two locking members are loosened.

Preferably, each of the two protrusions has two first inclined faces respectively defined in the top and the bottom thereof Each of the two grooves includes a second inclined face formed at each of the top and the bottom of the inside thereof The two first inclined faces of each protrusion are respectively matched with the two second inclined faces of the groove corresponding thereto.

Preferably, each of the two curved boards is curved upward and has a second slot defined therethrough. The two fixing bolts extend through the two second slots from the underside of the two curved boards. Each of the two fixing bolts has an urging member mounted thereto. Each of the two urging members has an anti-slip surface defined in the top thereof Each of the two respective anti-slip surfaces contacts against the underside of the two curved boards corresponding thereto.

Preferably, the clamp unit has a bottom clamp member, a top clamp member and a locking bar. The bottom clamp member is rested on the top of the curved boards. The bottom clamp member and the top clamp member clamp the rails of the seat. The locking bar has two threaded holes and the two fixing bolts are threadedly connected to the two threaded holes to press the locking bar on the top clamp member.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 6 shows the angle of the seat is adjusted.

DETAILED DESCRIPTION OF THE PREFERRED EMBODIMENT

Figure 1:
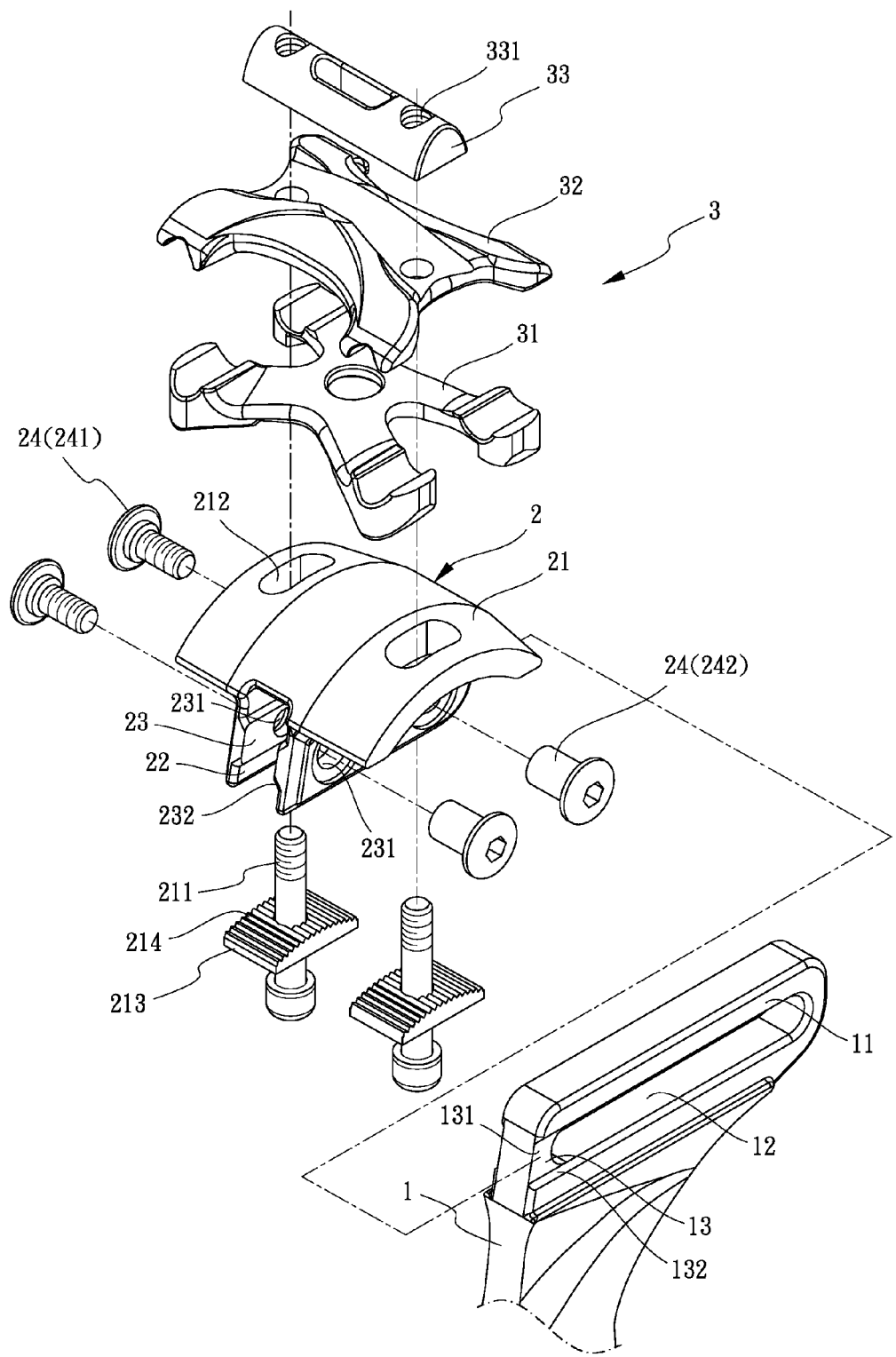
FIG. 1 is an exploded view of the bicycle adjustment device of the present invention.
Figure 2:
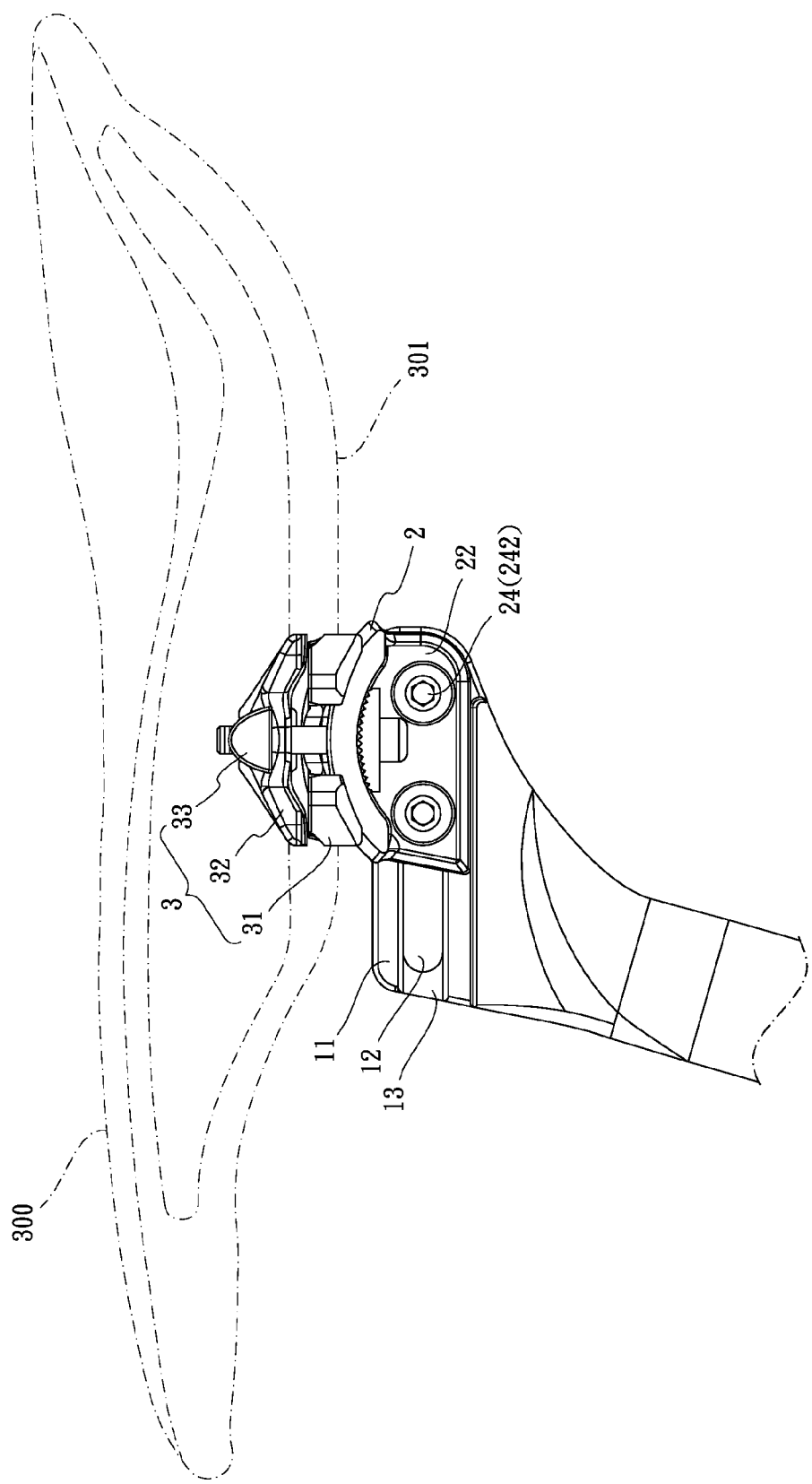
FIG. 2 is a side view of the bicycle adjustment device of the present invention.
Figure 3:
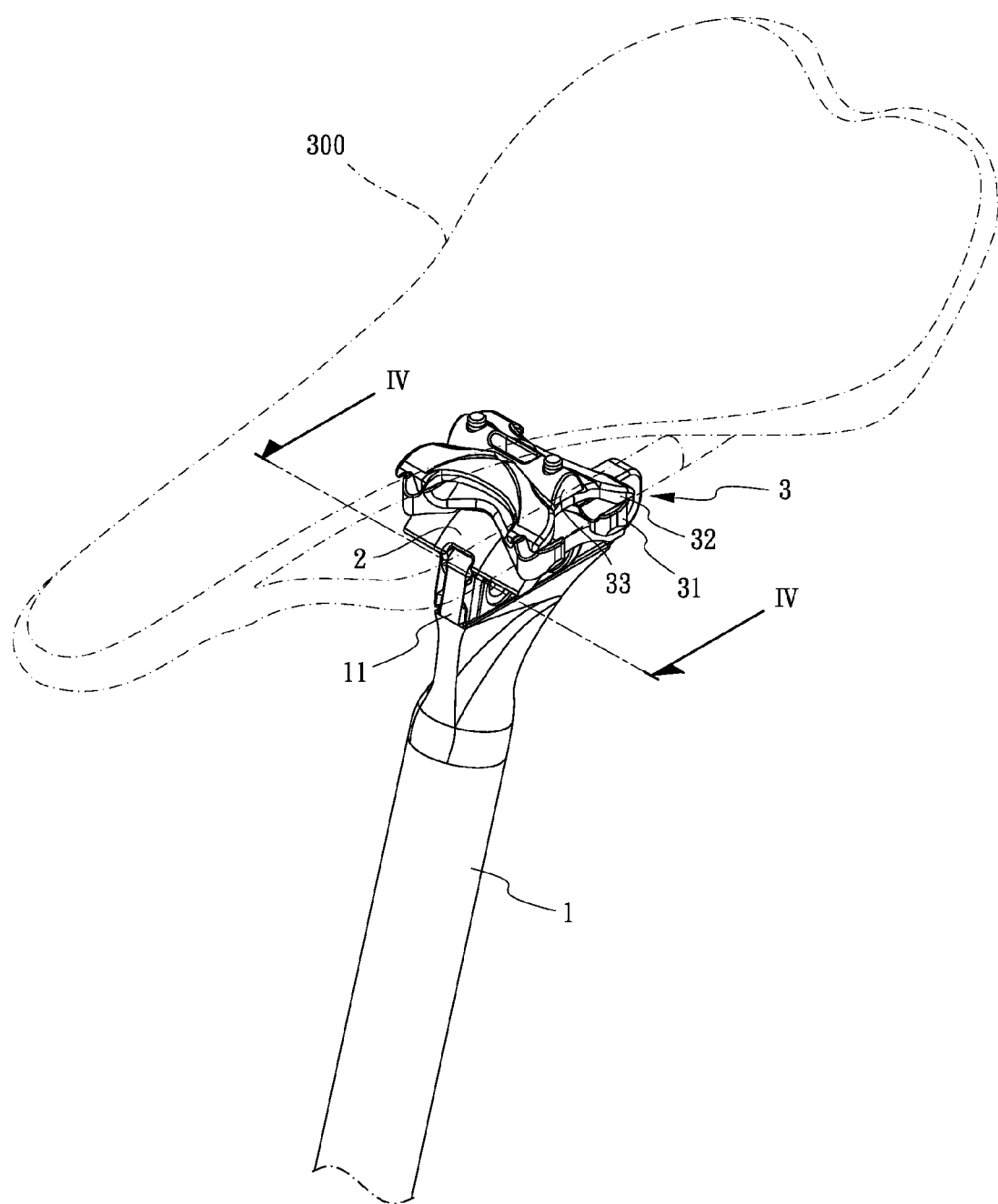
FIG. 3 is a perspective view to show the bicycle adjustment device of the present invention is connected with the seat and seat post.

Referring to FIGS. 1 to 3, the bicycle seat adjustment device of the present invention comprises a seat post 1 which has a support member 11 connected to the top thereof, wherein the support member 11 is an elongate member and has a first slot 12 defined transversely therethrough. A groove 13 is defined in each of two sides of the support member 11 and communicates with the first slot 12. Each groove 13 has an entrance 131 at one end thereof and the entrance 131 faces the forward direction/the handlebar of the bicycle.

A support seat 2 has a curved top and two curved boards 21 respectively extending from two sides of the curved top of the support seat 2. Each of the two curved boards 21 is curved upward and has a second slot 212 defined therethrough. Two plates 22 extend from the underside of the support seat 2, and each plate 22 has a protrusion 23 extending from the inside thereof The support member 11 is located between the two plates 22 and the two protrusion 23 slidably engaged with the two grooves 13 via the two entrances 131. Each of the two protrusions 23 has two first inclined faces 232 respectively defined in the top and the bottom thereof Each of the two grooves 13 includes a second inclined face 132 formed at each of the top and the bottom of the inside thereof The two first inclined faces 232 of each protrusion 23 are respectively matched with the two second inclined faces 132 of the groove 13 corresponding thereto. Each of the two plates 22 has two fixing holes 231 which extend through the protrusion 23 corresponding thereto. At least one locking unit 24 is used to connect the two plates 21 with the support member 11.

The at least one locking unit 24 includes two locking members 241 and two tubular sleeves 242. The two locking members 241 extend through the fixing holes 231 of one plate 22 and the first slot 241, and the two tubular sleeves 242 extend through the fixing holes 231 of the other plate 22 and the first slot 241. The two locking members 241 are threadedly connected to the two tubular sleeves 242. Therefore, the support member 11 is securely clamped between the two plates 22.

A clamp unit 3 is connected to the top of the support seat 2 so as to clamp a seat 300. The clamp unit 3 has a bottom clamp member 31, a top clamp member 32 and a locking bar 33. The bottom clamp member 31 is rested on the top of the curved boards 21. The bottom clamp member 31 and the top clamp member 32 clamp the rails 301 of the seat 300 as shown in FIGS. 2 and 3. The locking bar 331 has two threaded holes 331.

The two fixing bolts 211 extend from the underside of the two curved boards 21 and through the two second slots 212. Each of the two fixing bolts 211 has an urging member 231 mounted thereto, and each of the two urging members 231 has an anti-slip surface 214 defined in the top thereof The two fixing bolts 211 are threadedly connected to the two threaded holes 331 to press the locking bar 331 on the top clamp member 32. Each of the two respective anti-slip surfaces 214 contacts against the underside of the two curved boards 21 corresponding thereto. By this arrangement, the support seat 2 and the clamp unit 3 are securely connected to each other. The anti-slip surfaces 214 ensure that the fixing bolts 211 do not move relative to the second slots 212.

Figure 4:
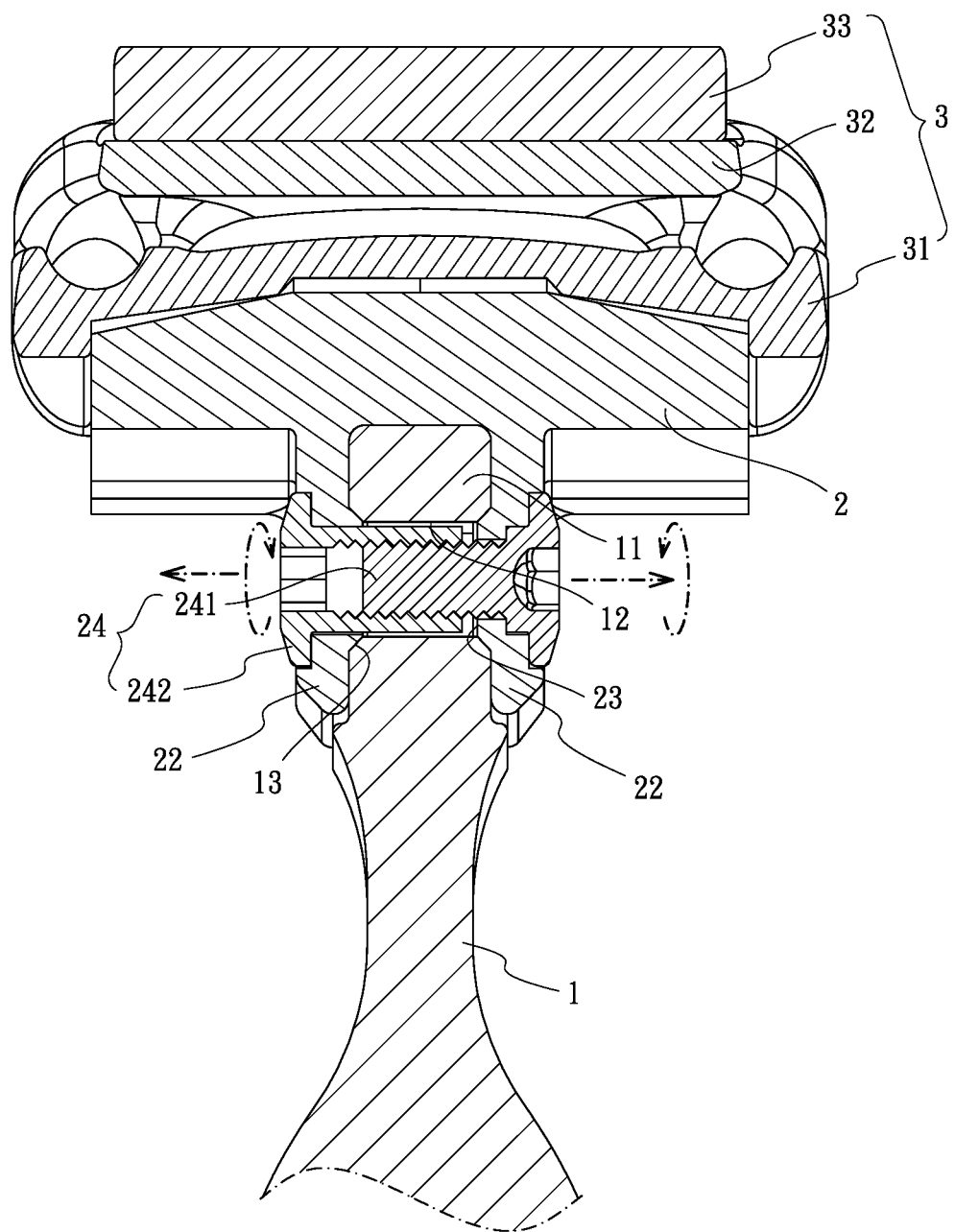
FIG. 4 is a cross sectional view, taken along line IV-IV in FIG. 3.
Figure 5:
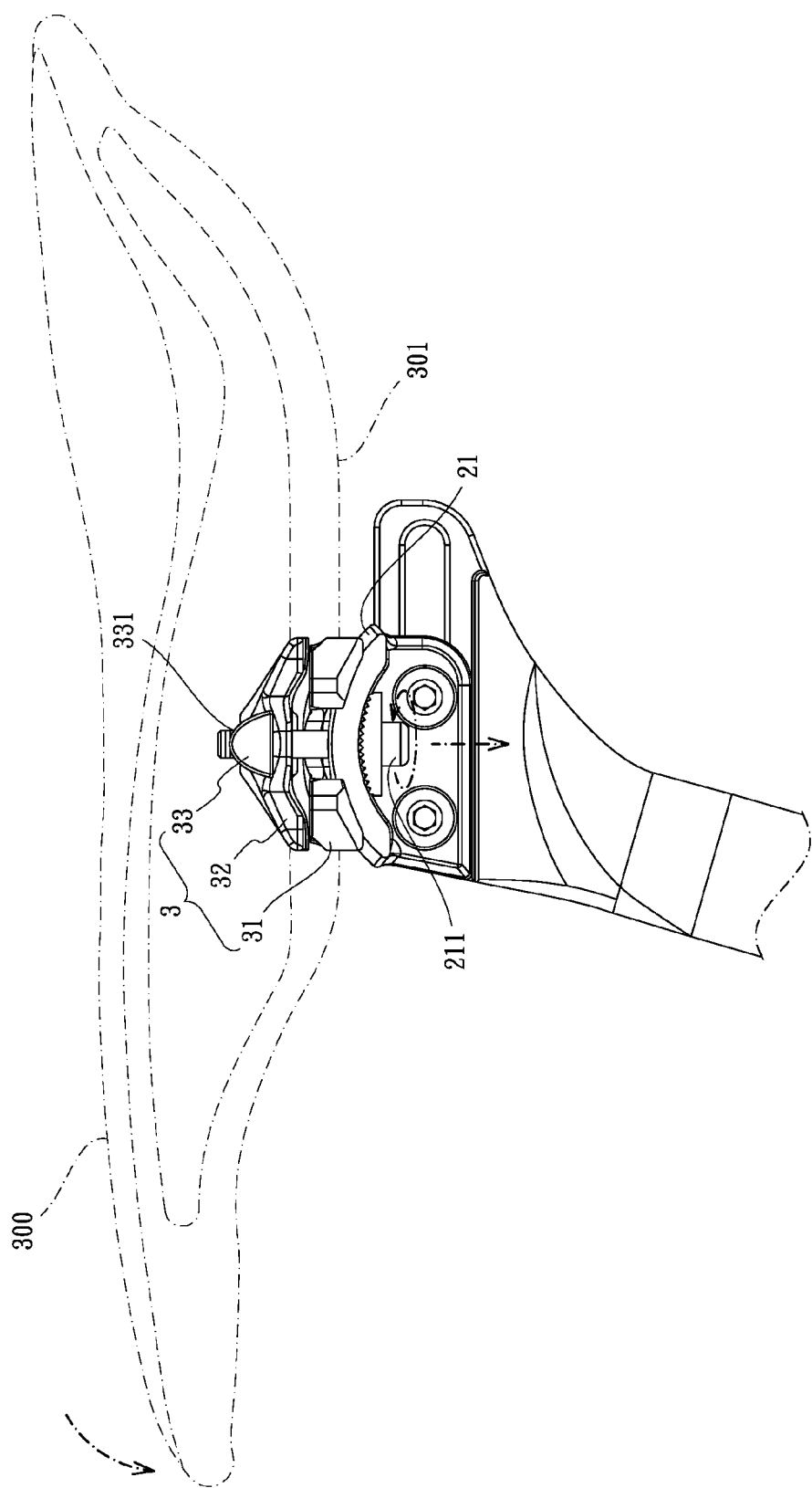
FIG. 5 shows that the seat is moved forward relative to the position of the seat as shown in FIG. 2, and the angle of the seat is to be adjusted by loosening the fixing bolts.

As shown in FIG. 4, when adjusting the bicycle seat 300 back and forth along the first slot 12, the two locking members 241 are unscrewed to loosen from the tubular sleeves 242, the support seat 2 is therefore movable back and forth by moving the two locking members 241 and the tubular sleeves 242 along the first slot 12, such that the distance from the handlebar to the front end of the seat 300 is adjusted. When the seat 300 is moved to a desired position, such as the position as shown in FIG. 5, the seat 300 is moved forward relative to the position of the seat 300 in FIG. 2, the two locking members 241 are screwed to be tightly connected to the tubular sleeves 242 to set the seat 300.

As shown in FIG. 5 again, when adjusting the angular position of the seat 300, the two fixing bolts 211 are unscrewed so as to slightly remove the anti-slip surface 213 from the underside of the two curved boards 21, so that the seat 300 together with the clamp unit 3 are movable along the curved boards 21 and the curved top of the support seat 2 to adjust the angle of the seat 300 relative to the axis of the seat post. As shown in FIG. 6, when the angle of the seat 300 is adjusted to the desired position, the two fixing bolts 211 are screwed to be tightly connected to the threaded holes 331 of the locking bar 31 to set the seat 300.

The advantages of the present are that the grooves 13 easily guide the protrusions 23 to be slidably engaged therewith so that the assembling processes become simple and easy.

The fixing bolts 211 extend through the second slots 212 from the underside of the two curved boards 21 so that when adjusting the fixing bolts 211, there will be no other parts to impede the adjustment actions.

The engagement of the second inclined faces 132 and the first inclined faces 232 helps the movement of the two protrusions 23 in the grooves 13.

While we have shown and described the embodiment in accordance with the present invention, it should be clear to those skilled in the art that further embodiments may be made without departing from the scope of the present invention.

What is claimed is:

1. A bicycle seat adjustment device comprising:
   a seat post having a support member connected to a top thereof, the support member having a first slot defined transversely therethrough, a groove defined in each of two sides of the support member and at least partially surrounding the first slot, each groove having an entrance at one end thereof and the entrance adapted to face a forward direction of a bicycle;
   a support seat having a curved top and two curved boards respectively extending from two sides of the curved top of the support seat, two plates extending from an underside of the support seat, each plate having a protrusion extending from an inside thereof, the support member located between the two plates and the two protrusions slidably engaged with the two grooves via the two entrances, at least one locking unit extending through the two plates, the two protrusions and the first slot to clamp the support member between the two plates, and
   a clamp unit connected to the top of the support seat and adapted to clamp a seat, two fixing bolts extending through the support seat and connected to the clamp unit, the clamp unit being movable along the curved boards and the curved top of the support seat when the two fixing bolts are loosened.

2. The bicycle seat adjustment device as claimed in claim 1, wherein each of the two plates has two fixing holes which extend through a respective one of the protrusions, the at least one locking unit extends through each of the fixing holes and the first slot.

3. The bicycle seat adjustment device as claimed in claim 2, wherein the at least one locking unit includes two locking members and two tubular sleeves, the two locking members extend through the fixing holes of one plate and the first slot, and the two tubular sleeves extend through the fixing holes of the other plate and the first slot, the two locking members are threadedly connected to the two tubular sleeves, the support seat is movable along the first slot when the two locking members are loosened.

4. The bicycle seat adjustment device as claimed in claim 3, wherein each of the two protrusions has two first inclined faces respectively defined in a top and a bottom thereof, each of the two grooves includes a second inclined face formed at each of a top and a bottom of an inside thereof, the two first inclined faces of each protrusion are respectively matched with the two second inclined faces of a respective one of the grooves.

5. The bicycle seat adjustment device as claimed in claim 4, wherein each of the two curved boards is curved upward and has a second slot defined therethrough, the two fixing bolts extend through the two second slots from an underside of the two curved boards, each of the two fixing bolts has an urging member mounted thereto, each of the two urging members has an anti-slip surface defined in a top thereof, each of the two respective anti-slip surfaces contacts against the underside of the two curved boards, respectively.

6. The bicycle seat adjustment device as claimed in claim 5, wherein the clamp unit has a bottom clamp member, a top clamp member and a locking bar, the bottom clamp member is rested on a top of the curved boards, the bottom clamp member and the top clamp member are adapted to clamp rails of the seat, the locking bar has two threaded holes and the two fixing bolts are threadedly connected to the two threaded holes to press the locking bar on the top clamp member.

7. The bicycle seat adjustment device as claimed in claim 1, wherein each of the two curved boards is curved upward and has a second slot defined therethrough, the two fixing bolts extend through the two second slots from an underside of the two curved boards, each of the two fixing bolts has an urging member mounted thereto, each of the two urging members has an anti-slip surface defined in a top thereof, each of the two respective anti-slip surfaces contact against the underside of the two curved boards, respectively.

8. The bicycle seat adjustment device as claimed in claim 7, wherein the clamp unit has a bottom clamp member, a top clamp member and a locking bar, the bottom clamp member is rested on a top of the curved boards, the bottom clamp member and the top clamp member are adapted to clamp rails of the seat, the locking bar has two threaded holes and the two fixing bolts are threadedly connected to the two threaded holes to press the locking bar on the top clamp member.

* * * * *